United States Patent

[11] 3,579,978

| [72] | Inventor | Dietrich Stams<br>Sindelfingen, Germany |
|---|---|---|
| [21] | Appl. No. | 822,381 |
| [22] | Filed | May 7, 1969 |
| [45] | Patented | May 25, 1971 |
| [73] | Assignee | Robert Bosch GmbH<br>Stuttgart, Germany |
| [32] | Priority | May 11, 1968 |
| [33] | | Germany |
| [31] | | P1750545.2 |

[54] HYDRAULIC DRIVE CONTROL ARRANGEMENT
12 Claims, 4 Drawing Figs.

[52] U.S. Cl.................................................. 60/19,
74/107
[51] Int. Cl..................................................... F02b 41/00
[50] Field of Search............................................ 60/19;
74/107

[56] References Cited
UNITED STATES PATENTS

| 1,981,805 | 11/1934 | Kacer et al. | 60/19X |
| 2,774,436 | 12/1956 | Ferris | 60/19X |
| 3,003,309 | 10/1961 | Bowers et al. | 60/19 |
| 3,371,479 | 3/1968 | Yapp et al. | 60/19 |

*Primary Examiner*—Edgar W. Geoghegan
*Attorney*—Michael S. Striker

ABSTRACT: A drive for a car or machine comprises a combustion engine driving a hydrostatic pump-motor transmission. The fuel supply of the combustion engine, the discharge volume of the pump, and the acceptance volume of the hydraulic motor are simultaneously adjusted by three cam followers under the control of three three-dimensional cam faces of a control cam which is manually turned, and axially shifted distances depending on the hydraulic pressure in the hydrostatic transmission so that maximum efficiency and performance are obtained.

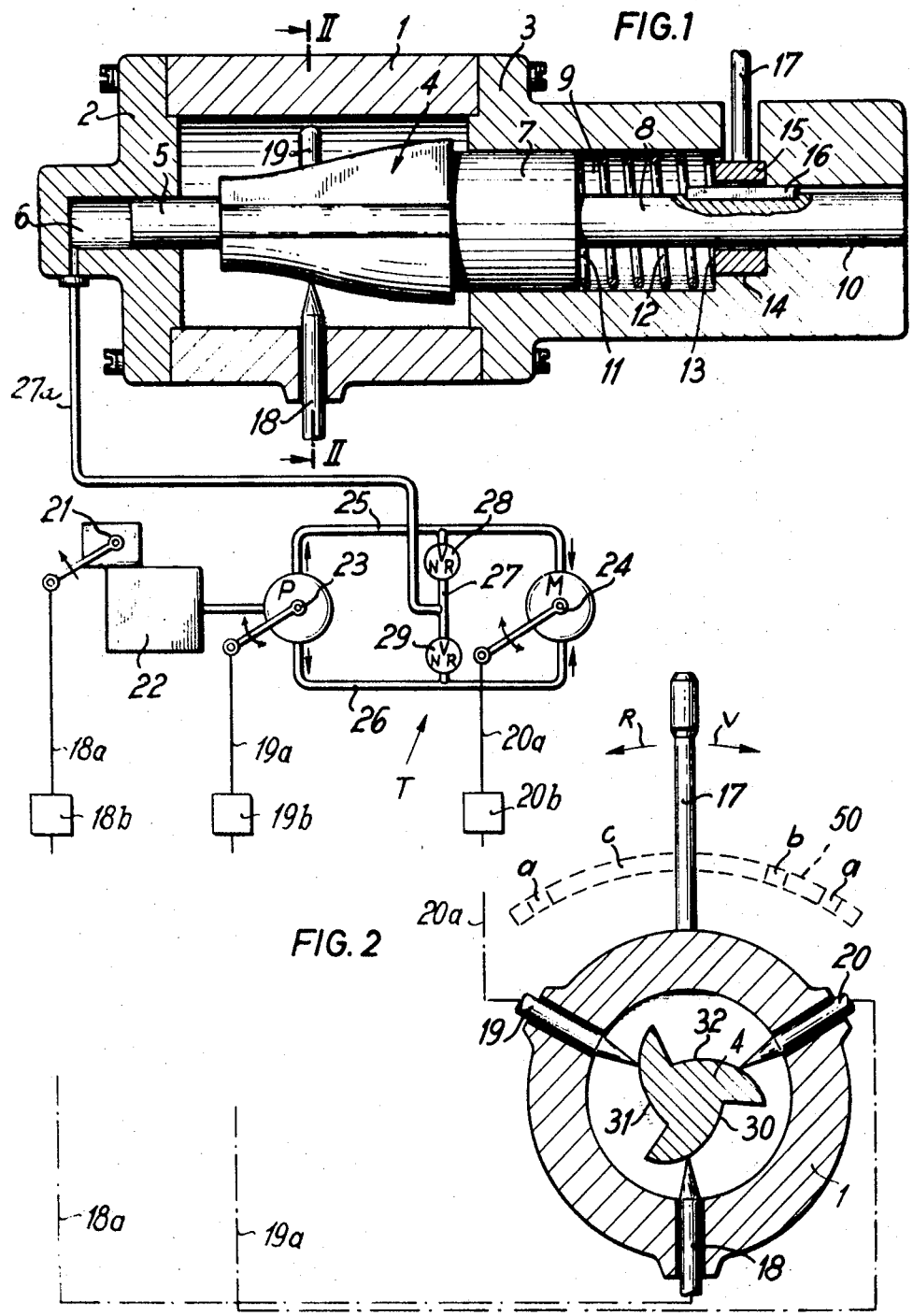

INVENTOR:
Dietrich STAMS

HYDRAULIC DRIVE CONTROL ARRANGEMENT

BACKGROUND OF THE INVENTION

The U.S. Pat. No. 3,003,309 discloses a control and regulating device for a hydrostatic transmission including an adjustable pump and a hydraulic motor, the pump being driven by a combustion engine. Manually operated cam means are provided for carrying out adjustments to different operational positions. The arrangement has the disadvantage that it cannot be set to operation at the highest possible efficiency or performance of the combustion engine and hydrostatic transmission, since the hydraulic motor is not adjustable, and the adjustment of the hydrostatic transmission is independent of the rotary speed at which the pump is driven. The arrangement is complicated, and expensive to manufacture.

The German Pat. No. 1,204,539 discloses a control and regulating arrangement for a hydrostatic transmission which is intended to obtain optimal efficiency of the hydrostatic transmission and optimal economy of fuel consumption. However, in order to obtain this result, a great number of control and regulating devices is necessary, including several centrifugal governors so that the apparatus is expensive, and subject to disturbances.

SUMMARY OF THE INVENTION

It is one object of the invention to overcome the disadvantages of drives including a combustion engine and a hydrostatic transmission, and to provide a hydraulic drive control arrangement which is compact and consists of few parts.

Another object of the invention is to provide a hydraulic drive control arrangement obtaining operation of the drive including a prime mover and a hydrostatic transmission, at maximum efficiency at maximum performance, and also under partial loads.

With these objects in view, the present invention is concerned with the control of drive means which include a prime mover, such as a combustion engine, having first adjustable regulating means for varying the fuel supply, and a hydrostatic transmission including a pump having second adjustable regulating means and being driven by the prime mover, and a hydraulic motor having third adjustable regulating means and being hydraulically connected with the pump.

The control device of the invention includes control means connected with the first, second and third regulating means for simultaneously adjusting the same to move to correlated positions. The control means is preferably a cam means having three three-dimensional cam surfaces respectively cooperating with cam followers which are connected to the three regulating means.

Manual means are provided for operating and setting the control means, for example, turning the cam means, so that the first, second, and third regulating means are set in accordance with operational conditions.

Pressure responsive means are hydraulically connected with the hydrostatic transmission and operatively connected with the control means, for example cam means, for automatically operating the same, for example shifting the same in axial direction, in accordance with the fluid pressure in the hydraulic transmission.

As a result, the first, second and third regulating means, and thereby the combustion engine, the pump, and the hydraulic motor, are continuously and automatically adjusted depending on the fluid pressure in the hydrostatic transmission.

By operation of the manual means and by the automatic adjustment in accordance with the fluid pressure, maximum performance and efficiency of the drive means can be obtained at different operational conditions.

The three-dimensional cam surfaces for the three regulating means, are designed and shaped to obtain maximum performance and optimum efficiency of the hydrostatic transmission and of the combustion engine. The pressure responsive means include a piston mounted in a cylinder to which high pressure fluid is supplied from the hydrostatic transmission to shift the cam means in one axial direction against the action of a spring, while the cam means can be turned by the manual means about its axis.

In one embodiment of the invention, the cam means includes three cams angularly spaced 120° about an axis, and each having a three-dimensional cam surface respectively sensed by three cam followers angularly spaced 120° when the cam means is manually turned or hydraulically shifted in axial direction. This cam construction takes up very little space. Another embodiment of the invention provides three axially aligned and connected cams, each of which have a three-dimensional cam surface sensed by a cam follower. This arrangement permits it to place each of the three cams in the proximity of the regulating means which is adjusted by the respective cam follower.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is partially a sectional view illustrating a control device in accordance with one embodiment of the invention, and partially a diagram schematically illustrating the prime mover and hydraulic transmission controlled by the control device;

FIG. 2 is a cross-sectional view taken on line II–II in FIG. 1, and includes a diagrammatic illustration of operational connections between cam followers illustrated in FIG. 2, and adjustable regulating means shown in FIG. 1;

DESCRIPTION OF THE PREFERRED EMBODIMENTS

Figure 3:
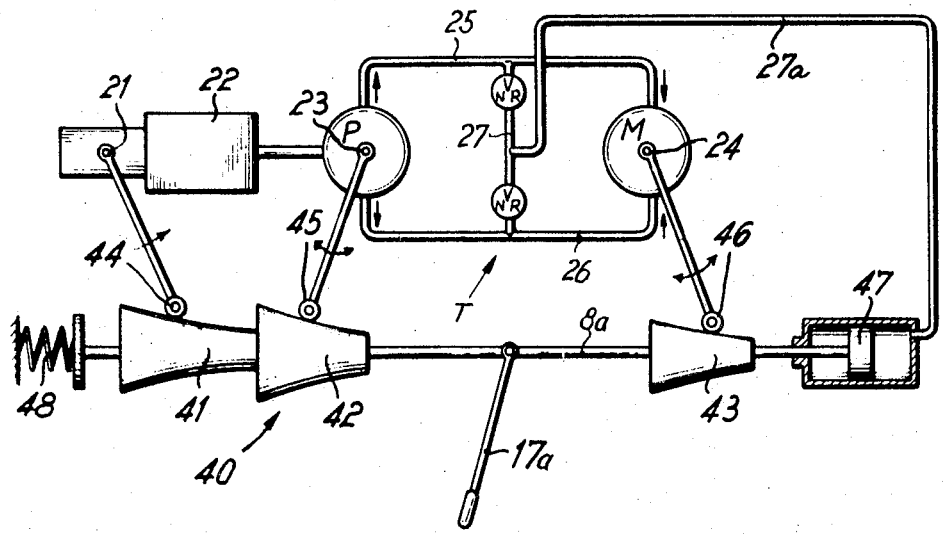
FIG. 3 is a schematic view illustrating a second embodiment of the invention in which three cams are axially aligned.

Referring first to FIG. 1, a housing 1 has a cylindrical main portion closed on one side by a first mounting portion 2 and on the other side by a second mounting portion 3. A cam means 4 includes three cam portions 30, 31, 32, as best seen in FIG. 2, each of which has a three-dimensional cam surface whose radius varies in circumferential direction as well as in axial direction. A first piston 5 is secured to the narrower end of cam means 4 and a second piston 7 is secured to the wider end of cam means 4 connected with the same for rotation about a common axis. A shaft 8 projects from the end face of piston 7 coaxial with pistons 7 and 5 and cam means 4.

Piston 5 is mounted with play in a bearing bore 6 of mounting portion 2, piston 7 is mounted in a bearing bore 9 of mounting portion 3, and shaft 8 is mounted in a bearing bore 10 of mounting portion 3 for rotation and axial movement. Bearing bore 9 has a greater diameter than bearing bore 10, so that a radial shoulder is formed on which one end of a spring 12 abuts whose other end abuts the end face of piston 7 so that control means 4, 5, 7 is biassed in axial direction to the left as viewed in the drawing to a normal position. Bearing bore 6 serves also as a cylinder for piston 5 and is supplied with pressure fluid through a conduit 27a, as will be described hereafter in greater detail, so that when the pressure in cylinder 6 is increased, the control means 5, 4, 7 is moved to the right in axial direction.

A bushing 15 is inserted into a stepped bore portion between bores 9 and 10 and is turnable in the same when operated by a handle lever 17 which projects out of a slot in mounting portion 3. A key 16 connects shaft 8 with an axial groove in bushing 15 so that shaft 10 with control means 4, 5, 7 can be manually turned by handle 17 and bushing 15, while being moved in axial direction either by the pressure in cylinder 6, or by the resilient force of spring 12. In the latter case, fluid displaced from bearing bore 6 flows through a small gap between piston 5 and the inner surface of bore 6 into the interior of housing 1.

Corresponding to the three cams and three dimensional cam surfaces 30, 31, 32, three cam followers 18, 19, and 20 are mounted with some play in radial bores of housing 1 for radial movement, and have pointed inner ends respectively in contact with the three three-dimensional cam faces 30, 31, 32. Cam followers 18, 19 and 20 are outwardly displaced when cam means 4 is turned in counterclockwise direction as viewed in FIG. 2, but are also outwardly displaced if cam means 4 is moved in axial direction to the left as viewed in FIG. 1. Reversed movements of cam means 4 will cause inward movement of cam followers 18, 19 and 20 which are inwardly biassed. The small cylindrical gaps between cam followers 18, 19, 20 and the respective radial bores permit fluid to escape from the interior of housing 1.

As shown in the diagrammatic portion of FIG. 1, a combustion engine 22 is the prime mover of a hydrostatic transmission T, and drives the shaft of a reversible and adjustable pump P which is connected by connecting conduits 25, 26 with a reversible and adjustable hydraulic motor M. The liquid in transmission T is preferably circulated in a closed circuit, and each connecting conduit 25 or 26 can function as high pressure conduit or low pressure conduit, depending on the selected direction of rotation of pump P. A third connecting conduit 27 connects conduits 25 and 26 and has two check valves 28 and 29 between which a conduit 27a, leading to the cylinder chamber 6 of piston 5, is connected. If high pressure prevails in conduit 25, check valve 28 opens and fluid at high pressure is supplied to cylinder chamber 6 while check valve 29 remains closed so that pump P is not idling. When higher pressure prevails in conduit 26 than in conduit 25, check valve 29 opens and check valve 28 remains closed, so that high pressure fluid is supplied through conduit 27a to cylinder chamber 6, irrespective of the direction of rotation of pump P.

Pump P and hydraulic motor M may be axial piston machines with wobble discs, radial piston machines, or vane machines. Details of the hydraulic transmission T such as auxiliary devices and valves are not illustrated in FIG. 1 for the sake of clarity and simplicity.

Combustion engine 22 is provided with a first regulating means 21 which is adjustable as schematically indicated by an arrow to vary and measure the amount of fuel supplied to the combustion engine 22. Regulating means 21 controls the throttle of an Otto motor, or the injection pump of a Diesel motor, for example. Pump P has second regulating means 23 schematically indicated by a double-headed arrow on the lever associated therewith as adjustable for controlling the volume of liquid discharged by the pump. Hydraulic motor M has third regulating means 24 schematically indicated by a double-headed arrow on the lever associated therewith as adjustable for adjusting the volume of motor M. As schematically indicated in FIGS. 1 and 2 by lines 18a, 19a and 20a, cam followers 18, 19 and 20 are respectively connected over power boosters 18b, 19b and 20b with the regulating means 21, 23 and 24. Displacement of cam followers 18, 19, 20 due to axial or angular displacement of cam means 4 will cause adjustment and regulation of combustion engine 22, pump P, and motor M, respectively. In the neutral position of handle lever 17 shown in FIG. 2 motor M does not run, but when handle 17 is turned in the direction of the arrow V, motor M rotates in a forward direction, and when handle 17 is turned in the direction of the arrow R, motor M rotates in reversed direction.

In the neutral position of handle 17, cam means 4 is also in a neutral angular position, and cam means 4 assumes a neutral axial position under the action of spring 12. By turning handle 17 farther out of its neutral position, the power output of the drive means including combustion engine 22 and hydrostatic transmission T is increased.

In any angularly displaced position of handle 17, bushing 15, and cam means 4, the regulating means 21, 23, 24 are simultaneously adjusted to assume correlated positions for obtaining high efficiency, output, and performance of the drive means 22, T. When the load on motor M varies, the pressure in conduit 27a and cylinder 6 also varies so that cam means 4 moves against the action of spring 12 to the right so that the positions of cam followers 18, 19, 20 are simultaneously adjusted to correlated positions due to the fact that each of the three cams 30, 31, 32 has a three-dimensional cam surface whose radial distance from the axis of cam means 4 varies not only in circumferential, but also in axial direction.

Each regulating means 21, 23, 24 includes a spring whose force is transmitted to the cam followers 18, 19 and 20 so that the same are inwardly biassed toward the respective cam surfaces. Since in the neutral position of handle 7, pump P is regulated to discharge no liquid, motor M is at a standstill so that its shaft cannot drive the wheels of a motor car, for example. Angular displacement of handle 17 in one or the other direction will cause forward or reverse movement of the car.

In order to obtain optimal control of the drive means including combustion engine 22 and the hydrostatic transmission T, it is necessary to design and construct the curves of the three-dimensional cam surfaces 30, 31, 32 in a specific manner so that the regulating means 21, 23, 24 simultaneously control the combustion engine, pump, and motor, in such a manner that the drive means 22, T operate at optimal efficiency when having full or partial power output which means that the drive means will have a condition operating at maximum efficiency and another position operating at maximum power output with an optimal efficiency.

Referring now to the embodiment of FIG. 3, the drive means is the same as described with reference to FIG. 1, and corresponding parts are indicated by like reference numerals. The cam means 40 includes three axially aligned and connected cams 41, 42, 43, each of which has a three-dimensional cam surface controlling a cam follower 44, 45, 46, respectively, which operate the regulating means 21, 23, 24. A spring 48, corresponds to spring 12, biases cam means 40 to the right, and a piston and cylinder means 47, corresponding to piston 5 and cylinder 6, urges cam means 40 to the left as viewed in FIG. 3 when the pressure is increased in connecting conduit 27a. The piston and cylinder means 47 form a circular gap about the piston permitting communication between the chambers on opposite sides of the piston when the same is displaced by spring 48.

A handle lever 17a is connected to a shaft 8a between cams 42 and 43 by a bushing, not shown in FIG. 3, corresponding to bushing 15 of the embodiment of FIG. 1, so that cams 41, 42, 43 can be turned by handle 17a while being moved in axial direction either by piston and cylinder 47 or by spring 48.

The construction of FIG. 3 permits it to space cams 41, 42, 43 in axial direction in such a manner that short linkages between cam followers 44, 45, 46 and the regulating means 21, 23, 24 are obtained. The cam construction can be further modified by providing a first cam having two diametrical cam portions instead of the three cam portions shown in FIG. 2, and providing a second cam axially aligned and connected with the first cam similar to the arrangement shown in FIG. 3 for cams 41, 42, or for cams 42, 43, depending on the position of the regulating means.

The three dimensional cam surfaces according to the invention, which are curved in two transverse planes, can be copied from a manually made template having the desired shape by copying the cam template. It is also possible to make a negative mold, and to cast a series of three-dimensional cams so that cams having a complex three-dimensional surface can be inexpensively manufactured.

The function of the drive means is extremely simple. The driver turns handle 17 or 17c to the left or right, depending on whether forward or reverse movement is desired, so that cam means 4 or 40 is displaced in angular direction whereby the regulating means of the combustion engine, pump, and motor are adjusted to the correlated position in which the drive operates at optimal efficiency. At the same time, the pressure in the hydrostatic transmission acts on piston 5 or 47 and axially displaces cam means 4 or 40 against the action of spring 12 or 48 while the cam followers slide on the three-dimensional cam surfaces of the cam portions of cam means 4 or 40.

Depending on the angular position of handle 17 or 17a, the drive means 22, T can be operated at the maximum efficiency, or at the highest possible power output, or at optimal efficiency under partial load.

As schematically shown in FIG. 2, handle 17 is guided in a slot of guide means 50 which is located in a plane perpendicular to the axis of cam means 4. Recesses a, or other arresting means, determine angular position of handle lever 17 in which maximum efficiency is obtained. Another recess or arresting means b for handle 17 defines the position during forward drive in which the highest output of the drive means 22, T is obtained. In intermediate position c, handle 17 is guided between the walls of the slots of guide means 50.

It is possible to use instead of the cam means 4 or 40, other control means for operating the regulating means of the combustion engine 22, pump P and motor M, while the pressure control from the hydrostatic transmission and the position of the manually operated handle are independent factors.

It will now be explained in which manner the curvature of the three-dimensional cam surfaces can be calculated for obtaining optimum control and regulation of the drive means by simultaneous adjustment of the regulating means 21, 23, 24 to correlated positions.

The pressure $p$ of the oil in the hydrostatic transmission T and the selected angle EH which handle 17 is displaced out of its neutral position, can be measured and are given. The position of the regulating means 21 for the injection pump of combustion engine 22, the theoretical displacement volume $H_p$ of the pump, and the theoretical volume $H_M$ of the motor must be calculated. First, the balance of the volumes of the pump P and hydraulic motor M is found under consideration of leakage losses.

$H_P \cdot h_P \cdot n_P - Q_{VP} = H_M \cdot h_M \cdot n + Q_{VP}$ wherein $H_P \cdot h_P \cdot n_P$ is the theoretical delivery per second of the pump P, and $Q_{VP}$ is the leakage flow of the same; $H_M \cdot h_M \cdot n_M$ = the theoretical volume of motor M, and $Q_{VM}$ is the leakage flow of the same, wherein $H_P$ and $H_M$ are the theoretical maximum displacement volumes of pump P and motor M, $h_P$ and $h_M$ are the theoretical displacement volumes of pump and motor divided by the maximum displacement volumes of pump and motor, and wherein $N_P$ and $n_M$ are the numbers of revolution of pump and motor.

Equations representing the turning moments are formed under consideration of the losses:
Pump:

$$M_P = \frac{1}{2\pi} \cdot H_P \cdot h_M \cdot p + M_{VP}$$

wherein $M_{VP}$ is the average loss moment of the pump.
Motor:

$$M_M = \frac{1}{2\pi} \cdot H_M \cdot h_M \cdot p - M_{VM}$$

wherein $M_{VM}$ is the average loss moment of the motor.

Leakage flow $Q_{VP}$, $Q_{VM}$ and the average loss moments $M_{VP}$, $M_{VM}$ of pump and motor depend on the displacement volumes $H_p \cdot h$ and $H_M \cdot h_M$ and on the number of revolutions $n_p$ and $n_M$, respectively, of pump and motor, the pressure difference $p$ between high and low pressure conduits and the average oil temperature being determined by measuring and regression analysis.

It is then necessary to determine the volumetric and mechanical efficiencies of pump P, $\eta_{VP}$, $\eta_{MP}$ and motor M, $\eta_{VM}$, $\eta_{MM}$. The efficiency of the pump $\eta_p$ is:

$\eta_P = \eta_{VP} \cdot \eta_{MP}$;

the efficiency of the motor $\eta_M$ is:

$\eta_M = \eta_{VM} \cdot \eta_{MM}$;

and the total efficiency $\eta_G$ of the hydrostatic transmission T is:

$\eta_G = \eta_P \cdot \eta_M$ which corresponds to the ratio between the power output and the power input.

Six different calculations have to be carried out:

Calculation 1: From the above equations representing the turning moments and torques, and from the equation representing the balance of the volumes of liquid flowing through the pump and motor, the three unknown transmission factors $h_P$, $n_M$, $p$ can be computed for the known values $H_P$, $M_p$, $n_p$ of the pump and $H_M$, $M_M$, $h_M$ for the motor, respectively. The influence of the oil temperature can be disregarded, if the dependency of the oil temperature on the loss-free output of the pump $N_p = M_p \cdot 2\pi n_p$ is known.

Calculation 2: Calculation 1 is carried out for several values of $h_M$, and for each value $h_M$ all transmission factors can be computed. The variation $h_M$ is permitted only in the range $h_{Mmin} \leq h_M \leq h_{Mmax}$. In this range the value $h_M$ is selected for which $\eta_G$ is a maximum. Calculation 2 supplies to the given values $H_p$, $M_p$, $n_p$ of the pump and $H_M$, $M_M$ of the motor all factors of the transmission.

Calculation 3: The efficiency $\eta_e$ of the Diesel motor 22 is found as a function the number of revolutions and the average piston pressure, or from the number of revolutions and the output torque:

$\eta_e = \eta_e(n_p, M_p)$.

In accordance with the equations:

$N_p = 2\pi \cdot M_P \cdot n_p$ and
$N_M = 2\pi \cdot M_M \cdot n_M$ instead of the number of revolutions $n_p$ and moment $M_P$ also number of revolutions $n_P$ and output $N_P$ can be used and (a) $$M = \frac{N_p}{2\pi \cdot n_p}$$

follows so that also $\eta_e = \eta_e(n_P \cdot N_p)$ follows.

In accordance with calculation 2 and equation (a) all factors concerning the transmission are calculated from the given values $H_p$, $n_P$, $N_P$ and $H_M$, $M_M$ of the pump and motor, respectively, particularly the efficiency of the hydrostatic transmission $\eta_G$.

From the last equation, the motor efficiency $\eta_e$ and the total efficiency of the drive means 22, T can be found $\eta_{tot} = \eta_e \cdot \eta_G$ The numbers of revolutions $n_P$ are now varied within the permissible range, and for each value $n_P$ all transmission factors, and particularly $\eta_{tot}$ are calculated, and the value of $n_P$ found for which $\eta_{tot}$ is a maximum. With each pair of values $n_P$, $M_P$ a particular distance of movement of the injection pump of the Diesel motor is associated.

Calculation 3 supplies all transmission factors for the given values $H_P$, $N_P$; $H_M$, $M_M$ and also the regulating distance of injection pump. The total efficiency of the drive means $\eta_{tot}$ is a maximum.

In accordance with calculation 4 the value $N_P$ is varied for the given values $H_p$, $H_M$, $M_M$ within a permissible range $N_{Pmin} \leq N \leq N_{Pmax}$, and all transmission factors and the regulating distance of injection pump can be calculated. Particularly the total efficiency of the drive means $\eta_{tot} = \eta_{tot}(N_p)$ is examined, and the value $N_p$ in the suitable range in which $\eta_{tot}$ is a maximum, is selected as a result.

Calculation 4: supplies for the given values $H_P$, $H_M$, $M_M$ all transmission factors and the regulating distance of the injection pump of combustion motor 22. The total efficiency of the drive means $\eta_{tot}$ is a maximum.

Calculation 5: as in calculation 4, the value $N_P$ is varied within a permissible range, and all transmission factors and the regulating distance of the injection pump are calculated, but the output power $N_M = N_M(N_P)$ is considered, and the value of $N_P$ is selected for which the output power $N_M$ is a maximum.

Calculation 5 uses for the given value $H_P$, $H_M$, $M_M$ all transmission factors and the regulating distance of the injection pump. The total output power $N_M$ is a maximum.

Calculation 6: follows calculation 3 in which for the given values $H_P$, $N_P$; $H_M$, $M_M$ the regulating distance of the injection pump and all transmission factors, particularly $p$ are determined; $p=p(H_p, N_P; H_M, M_M)$. Generally, $p$ increases in a linear function with $M_m$ since, without consideration of losses, the above equation concerning the turning moment is $p=2\pi/H_M$ when $M_m=0$. By variation of $M_M$ for maintained values $H_p, N_p; H_M$, tables for P and $M_M$ can be made from which the reversed function $M_M=M_M(H_p, N_p; H_M, p)$ follows. Therefore, in accordance with calculation 3 it is found as a result of calculation 6 that for the given values $H_P, H_P; H_M$, P, all transmission factors and the regulating distance of the injection pump are determined.

As a result of calculation 6 are obtained:
1. All factors of the hydrostatic transmission and the regulating distance of injection pump of the Diesel motor. The total efficiency $\eta_{tot}$ is a maximum for the given values $H_P, N_P, H_M, p$.

If the same calculations are applied to the result of calculations 4 and 5, two further results are obtained:
2. All transmission factors and the regulating distance of the injection pump. The total efficiency $\eta_{tot}$ is a maximum for the given values $H_P, H_M, p$.
3. All transmission factors and the regulating distance of the injection pump. The total output $N_M$ is a maximum for the given values $H_P, H_M, p$.

Figure 4:
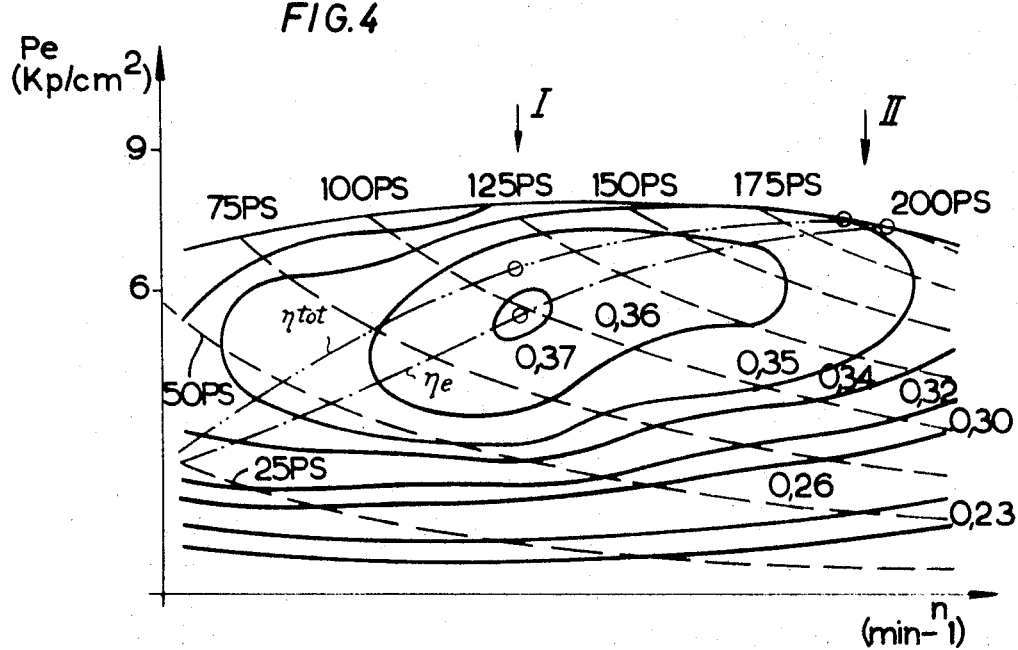
FIG. 4 is a diagram illustrating graphically efficiency and performance of the drive means including the combustion engine, and the hydrostatic transmission.

From the above calculations the following results can be computed for a Diesel motor and a hydrostatic transmission.
  a. For a given output power $N_P$ of the Diesel motor and the measured pressure $p$ of the transmission, the regulating distance of the injection pump, the displacement volume $h_P$ of the pump, and the volume $h_M$ of the motor can be calculated, and the efficiency of the drive means 22, T is a maximum.
  b. The calculation as explained at $a$ is carried out, but $N_P$ is selected so that the best possible maximum efficiency is obtained. Particularly, the value for the drive power is calculated at this point $N_{P1}$, which is indicated in FIG. 4 by an arrow I.
  c. For the measured pressure $p$ of the hydrostatic transmission, the regulating distance of the injection pump, the displacement volume $h_P$ of the pump, and the volume $h_M$ of the motor can be found. The output power $N_M$ is a maximum, and the drive power at the operational point $N_{P2}$ indicated in FIG. 4 by the arrow II, is calculated.

The three-dimensional cam surfaces can be designed so that the adjusted motor output power $N_P$ is proportional to the angular displacement EH of handle 17.

$$N_p = \alpha \cdot EH.$$

Corresponding to $N_p$, the angular displacement EH of handle 17 varies within the following ranges:
$$EH_{min} \leq EH \leq Eh_{max}$$
$$EH_{brake} \leq EH \leq EH_{drive}$$

For the operational condition I where the maximum efficiency $\eta_{tot}$ with $N_P=N_{P1}$ prevails, the angular position $EH=EH_1$ results. For the operational condition II where the total output $N_M$ is a maximum and $N_P=N_{P2}$, the angular displacement $EH=EH_2=EH_{max}$ results.

For operational conditions with power output below and above $N_{P1}$, the handle is in intermediate positions. These operational conditions particularly occur in driving and braking ranges.

For a given angular displacement EH of handle 17 and a given hydrostatic pressure $p$ of the transmission T, the regulating distance RW of the injection pump, the displacement volume $h_P$ of the pump, and the displacement volume $h_M$ of the motor can be calculated and the three-dimensional cam surfaces correspondingly designed.

As explained above, arresting means $a$ can be provided for arresting handle 17 in the position for maximum efficiency, and $b$ for arresting handle 17 in the position for maximum output.

In order to determine the three-dimensional curvature of cam means 4 or 40, an efficiency and power output characteristic of the Diesel motor, representing information regarding the specific fuel consumption, output, and regulating distance as shown in FIG. 4 is required. For the pump P and motor M, information regarding the leakage oil losses and the loss moment depending on the pump discharge and motor acceptance volumes, the number of revolutions, the operational pressure, and the temperature of the oil are required.

FIG. 4 shows a characteristic efficiency-output diagram for a Diesel motor. The ordinate is the average pressure $p_e$ and the abscissa represents the number of revolutions per minute. The broken line graphs represent the output, the single dotted line represents the maximum efficiency of the Diesel motor, the double dotted line represents the maximum efficiency of the entire drive means including the Diesel motor 22 and the hydrostatic transmission T. The arrow I indicates the maximum efficiency, and the arrow II indicates the maximum output of the drive means 22, T.

The hydrostatic transmission T has losses, and its efficiency depends on the selected and set pump discharge and motor acceptance volumes, the number of revolutions, the oil pressure, and the oil temperature. If the number of revolutions is reduced, the efficiency improves which results in increased pressure so that the efficiency drops again. Therefore, the double dotted chain line $\eta_{tot}$ represents the maximum efficiency and not the single dotted chain line $\eta_e$.

It is necessary to construct the curves of the three-dimensional cam surfaces in such a manner that the regulating means of the injection pump of the Diesel motor 22, and the regulating means controlling the discharge and acceptance volumes of the pump and motor, respectively are controlled by handle 17 depending on its angular displacement of handle so that the entire drive means 22, T always operates at optimal efficiency at a partial power output selected by the position of lever 17, or operates at the output at which the maximum efficiency can be obtained, or operates to produce a maximum output. These positions can be indicated on the guide means 50 of handle 17.

The curvature of the three-dimensional cam surfaces for obtaining optimal regulation and control are calculated as explained above.

It will be understood that each of the elements described above, or two or more together, may also find a useful application in other types of drive means including a prime mover and a hydraulic transmission differing from the types described above.

While the invention has been illustrated and described as embodied in a hydraulic drive control arrangement in which the regulating means of a combustion engine, of a pump, and of a hydraulic motor are simultaneously controlled by a three-dimensional cam for obtaining optimal efficiency of operation, it is not intended to be limited to the details shown, since various modifications and structural changes may be made without departing in any way from the spirit of the present invention.

What is claimed as new and desired to be protected by Letters Patent is set forth in the appended claims.

I claim:
1. Hydraulic drive control arrangement, comprising, in combination, drive means including a prime mover having first adjustable regulating means, and a hydrostatic transmission including a pump having second adjustable regulating means and being driven by said prime mover, and a hydraulic motor having third adjustable regulating means and being hydraulically connected with said pump; and a control device including control means connected with said first, second, and third regulating means for simultaneously adjusting the same to move to correlated positions, manual means for operating and setting said control means and thereby said first, second and third regulating means in accordance with operational conditions, and pressure responsive means hydraulically connected with said transmission and operatively connected with said control means for automatically operating the same in accordance with the fluid pressure in said transmission so that said first, second, and third regulating means are also continuously and automatically adjusted depending on the fluid pres- sure in said transmission whereby by operation of said manual means maximum performance and optimal efficiency of said drive means can be obtained at different operational conditions.

2. Hydraulic drive control arrangement as claimed in claim 1 wherein said control means includes cam means having three three-dimensional cam surfaces, and first, second, and third cam follower means cooperating with said cam surfaces and being respectively connected with said first, second, and third regulating means for simultaneously adjusting the same, said three-dimensional cam surfaces having such a shape that said cam follower means set said first, second, and third regulating means simultaneously to correlated positions in which said drive means operate at optimal efficiency and maximal output; wherein said manual means move said cam means in one direction; and wherein said pressure responsive means move said cam means in a direction transverse to said one direction.

3. Hydraulic drive control arrangement as claimed in claim 2 wherein said prime mover is a combustion engine, and wherein said first regulating means regulates and measures the fuel supplied to said combustion engine.

4. Hydraulic drive control arrangement as claimed in claim 2 wherein said control device includes mounting means for mounting said cam means for rotation about an axis, and for rectilinear movement in opposite axial directions; wherein said manual means are connected with said cam means for turning the same about said axis; wherein said mounting means include a cylinder connected with said transmission for receiving high pressure fluid from said pump; and wherein said pressure responsive means include a piston secured to said cam means and located in said cylinder so that the pressure in the same moves said piston and said cam means in one axial direction, and biassing means biassing said cam means and said piston in the opposite axial direction.

5. Hydraulic drive control arrangement as claimed in claim 4 wherein said cam means includes three cam uniformly spaced at angles of 120° about said axis, each cam having a three-dimensional cam surface; and wherein said first, second, and third cam follower means are located in a common plane transverse to said axis spaced at angles of 120° and supported on said mounting means for radial movement, said first, second, and third cam follower means having inner ends cooperating with said three-dimensional cam surfaces of said three cams, respectively, and outer ends respectively connected with said first, second, and third regulating means.

6. Hydraulic drive control arrangement as claimed in claim 4 wherein said cam means includes first, second, and third axially aligned cams connected with each other for turning movement about said axis, and being connected with each other for movement in said opposite axial directions; wherein said first, second and third cams have three-dimensional cam surfaces; wherein said first, second, and third cam follower means are spaced in axial direction and cooperate with said three-dimensional cam surfaces of said first, second, and third aligned cams, respectively.

7. Hydraulic drive control arrangement as claimed in claim 4 wherein said cam means has said piston at one axial end and a second piston at the other axial end; wherein said mounting means includes first and second bearings for mounting said pistons for rotation and axial movement with said cam means, said first bearing communicating with said cylinder and said second bearing supporting said other piston; and wherein said biassing means includes a spring abutting said other piston.

8. Hydraulic drive control arrangement as claimed in claim 7 wherein said manual means include a shaft coaxial with said cam means and secured to the same for axial and turning movement, a bushing supported by said mounting means for turning movement, and nonmovable in axial direction, said shaft being surrounded by said bushing and connected with the same for turning movement and being movable relative to the same in said opposite axial directions, and a handle secured to said bushing for turning the same with said shaft and said cam means while the same move in said opposite axial directions.

9. Hydraulic drive control arrangement as claimed in claim 8 comprising guide means having a slot in which said handle is guided for movement in a plane transverse to said axis; and wherein said guide means has means for arresting said handle at angular positions at which said drive means operate at maximum efficiency and performance.

10. Hydraulic drive control arrangement as claimed in claim 4 wherein said transmission includes a first connecting conduit connecting the outlet of said pump with the inlet of said hydraulic motor, a second connecting conduit connecting the inlet of said pump with the outlet of said motor, and a third connecting conduit connecting said first and second connecting conduits; and wherein said pressure responsive means include two check valves in said third connecting conduit acting in opposite flow directions, and a conduit connected at one end to said third connecting conduit between said check valves, and connected at the other end with said cylinder so that said piston is subjected to the higher fluid pressure of the different fluid pressures produced in said first and second connecting conduits.

11. Hydraulic drive control arrangement as claimed in claim 4 comprising first, second, and third power boosters respectively controlled by said first, second and third cam follower means and respectively operating said first, second, and third regulating means.

12. Hydraulic drive control arrangement as claimed in claim 1 wherein said prime mover is a combustion engine and said first regulating means regulates the fuel supplied to said combustion engine; wherein said second regulating means regulates the fluid volume discharged by said pump; and wherein said third regulating means regulates the fluid volume accepted by said hydraulic motor.